(12) United States Patent
Bollinger et al.

(10) Patent No.: US 11,928,643 B2
(45) Date of Patent: Mar. 12, 2024

(54) DIGITAL SMART LABEL FOR SHIPPER WITH DATA LOGGER

(71) Applicant: CRYOPORT, INC., Irvine, CA (US)

(72) Inventors: Bret Bollinger, Yorba Linda, CA (US); Ben Lee, Corona, CA (US)

(73) Assignee: Cryoport, Inc., Irvine, CA (US)

( * ) Notice: Subject to any disclaimer, the term of this patent is extended or adjusted under 35 U.S.C. 154(b) by 317 days.

(21) Appl. No.: 16/446,123

(22) Filed: Jun. 19, 2019

(65) Prior Publication Data

US 2019/0303862 A1  Oct. 3, 2019

Related U.S. Application Data

(63) Continuation-in-part of application No. 14/589,768, filed on Jan. 5, 2015, now abandoned.
(Continued)

(51) Int. Cl.
*G06Q 10/08* (2023.01)
*G06F 3/0482* (2013.01)
(Continued)

(52) U.S. Cl.
CPC ....... *G06Q 10/0838* (2013.01); *G06F 3/0482* (2013.01); *G06F 3/04886* (2013.01); *G06K 7/1413* (2013.01); *G06F 16/53* (2019.01)

(58) Field of Classification Search
CPC .. G06Q 10/0833; G06Q 10/08; G06Q 10/083; G06Q 10/0838; G06Q 10/08355;
(Continued)

(56) References Cited

U.S. PATENT DOCUMENTS 6,467,642 B2   10/2002   Mullens et al.
6,539,360 B1    3/2003   Kadaba
(Continued)

FOREIGN PATENT DOCUMENTS

JP    2001-225926      8/2001
WO    2020157488 A1    8/2020

OTHER PUBLICATIONS

Herst, E. R. (1993). AEI adds accuracy to JIT logistics. Global Trade & Transportation, 113(11), 58. Retrieved from https://dialog.proquest.com/professional/docview/211041855?accountid=131444 (Year: 1993).*

(Continued)

*Primary Examiner* — Michael P Harrington
(74) *Attorney, Agent, or Firm* — Snell & Wilmer L.L.P.

(57) ABSTRACT

Methods, systems, devices and/or apparatuses for an electronic shipping label. The electronic shipping label includes a communication device that is configured to obtain from an electronic device multiple electronic image files. The electronic shipping label includes a touch-screen display that has one or more user interface elements that are configured to toggle among the multiple electronic image files and initiate access to the shipping container. The electronic shipping label includes a processor. The processor is configured to obtain a first electronic image file from the multiple electronic image files. The processor is configured to render the first electronic image file during a first leg of the plurality of legs of the shipping itinerary. The processor is configured to access a second electronic image file from the multiple electronic image files or the shipping container when the one or more user interface elements are selected.

10 Claims, 8 Drawing Sheets

Related U.S. Application Data

(60) Provisional application No. 61/924,399, filed on Jan. 7, 2014.

(51) Int. Cl.
*G06F 3/04886* (2022.01)
*G06K 7/14* (2006.01)
*G06Q 10/083* (2023.01)
*G06F 16/53* (2019.01)

(58) Field of Classification Search
CPC ........... G06Q 10/0835; G06Q 10/0832; G06Q 10/0834
See application file for complete search history.

(56) References Cited

U.S. PATENT DOCUMENTS

| | | | |
|---|---|---|---|
| 7,627,926 B2 | 12/2009 | Williams | |
| 7,766,238 B2 | 8/2010 | Gelbman | |
| 7,881,987 B1 | 2/2011 | Hart | |
| 8,220,107 B2 | 7/2012 | Williams | |
| 8,397,343 B2 | 3/2013 | Williams | |
| 9,292,824 B1 | 3/2016 | Freeman | |
| 9,378,442 B2 | 6/2016 | Barnings | |
| 9,805,521 B1* | 10/2017 | Davidson | G06Q 10/0639 |
| 10,342,737 B1 | 7/2019 | Shanmugavelayudam et al. | |
| 11,301,800 B1* | 4/2022 | Bhagwat | G06K 7/1413 |
| 2002/0099567 A1 | 7/2002 | Joao | |
| 2002/0102992 A1 | 8/2002 | Koorapaty | |
| 2002/0167500 A1 | 11/2002 | Gelbman | |
| 2003/0137968 A1 | 7/2003 | Lareau et al. | |
| 2004/0183673 A1 | 9/2004 | Nagelli | |
| 2004/0215532 A1 | 10/2004 | Boman | |
| 2004/0236635 A1 | 11/2004 | Publicover | |
| 2005/0046584 A1 | 3/2005 | Breed | |
| 2005/0171738 A1 | 8/2005 | Kadaba | |
| 2005/0234785 A1* | 10/2005 | Burman | G06K 19/07703 705/28 |
| 2005/0237203 A1 | 10/2005 | Burman | |
| 2005/0246192 A1 | 11/2005 | Jauffred et al. | |
| 2006/0080819 A1 | 4/2006 | McAllister | |
| 2006/0168644 A1 | 7/2006 | Richter et al. | |
| 2007/0009119 A1 | 1/2007 | Pohle et al. | |
| 2007/0028642 A1 | 2/2007 | Glade et al. | |
| 2007/0180847 A1 | 8/2007 | Schabron et al. | |
| 2007/0268138 A1* | 11/2007 | Chung | G06Q 10/087 340/572.1 |
| 2008/0094209 A1 | 4/2008 | Braun | |
| 2008/0162304 A1 | 7/2008 | Ourega | |
| 2008/0291033 A1 | 11/2008 | Aghassipour | |
| 2008/0303637 A1* | 12/2008 | Gelbman | G06K 17/00 340/10.42 |
| 2009/0014537 A1 | 1/2009 | Gelbman | |
| 2009/0293524 A1 | 12/2009 | Vezina et al. | |
| 2009/0314835 A1* | 12/2009 | Jackson | G07B 17/00508 235/384 |
| 2009/0322510 A1 | 12/2009 | Berger et al. | |
| 2010/0080168 A1 | 4/2010 | Fukuyama | |
| 2010/0299278 A1* | 11/2010 | Kriss | G06Q 10/08 705/332 |
| 2010/0332284 A1 | 12/2010 | Hilbush | |
| 2011/0145162 A1 | 6/2011 | Vock | |
| 2011/0216178 A1 | 9/2011 | Carpenter | |
| 2011/0221573 A1 | 9/2011 | Huat | |
| 2012/0235791 A1 | 9/2012 | Donlan et al. | |
| 2013/0245991 A1 | 9/2013 | Kriss | |
| 2015/0034720 A1 | 2/2015 | Minoque | |
| 2017/0177883 A1 | 6/2017 | Paterra | |
| 2019/0303862 A1 | 10/2019 | Bollinger | |
| 2019/0306663 A1* | 10/2019 | Ruth | H04W 4/029 |
| 2020/0085036 A1 | 3/2020 | Creasey et al. | |
| 2021/0298507 A1 | 9/2021 | Grijalva et al. | |
| 2022/0164762 A1 | 5/2022 | Bollinger et al. | |

OTHER PUBLICATIONS

USPTO; Office Action dated Dec. 2, 2011 in U.S. Appl. No. 12/658,641.
USPTO; Final Office Action dated Aug. 14, 2012 in U.S. Appl. No. 12/658,641.
USPTO; Office Action dated Sep. 11, 2015 in U.S. Appl. No. 12/658,641.
USPTO; Office Action dated Dec. 12, 2011 in U.S. Appl. No. 12/852,413.
USPTO; Final Office Action dated May 10, 2012 in U.S. Appl. No. 12/852,413.
USPTO; Advisory Action dated Jul. 31, 2012 in U.S. Appl. No. 12/852,413.
USPTO; Office Action dated Jun. 18, 2014 in U.S. Appl. No. 12/852,413.
USPTO; Office Action dated Jun. 17, 2016 in U.S. Appl. No. 12/852,413.
USPTO; Final Office Action dated Nov. 29, 2016 in U.S. Appl. No. 12/852,413.
PCT; International Search Report dated Jun. 28, 2010 in PCT US/2010/023252.
PCT; Written Opinion of International Search Authority dated Jun. 28, 2010 in PCT US/2010/023252.
PCT; International Preliminary Report on Patentability dated Mar. 22, 2013 in PCT US/2010/023252.
https://web.archive.org/web/20051024044235/http://www2.parc.com/hsl/projects/gyricon/, Electronic Reusable Paper (Year: 2005).
PCT; International Search Report & Written Opinion dated Oct. 7, 2020 in PCT Application No. US2020/038231.
PCT; International Preliminary Report on Patentability (IPRP) dated Dec. 21, 2021 in Application No. PCT/US2020/038231.
UK; Examination Report dated Dec. 12, 2022 in Application Serial No. 2118402.3.
EP; Search Report dated Jun. 13, 2023 in EPO patent application Serial No. 20825422.7.
UK; Notice of Allowance dated Jun. 15, 2023 in GB Application serial No. 2118402.3.
KIPO; International Search Report & Written Opinion in PCT Application Serial No. PCT/US2023/011995 dated May 30, 2023.
UK; Search Report dated Jul. 31, 2023 in UK patent application Serial No. 2310937.4.
USPTO; Restriction requirement dated Aug. 30, 2023 in U.S. Appl. No. 17/666,361.
IPO; Examination Report under Section 18(3) dated Oct. 18, 2023 for Application No. GB2310937.4.
USPTO; Non-Final Office Action dated Oct. 31, 2023 for U.S. Appl. No. 17/666,361.

* cited by examiner

DIGITAL SMART LABEL FOR SHIPPER WITH DATA LOGGER

CROSS-REFERENCE TO RELATED APPLICATIONS

This application is a continuation-in-part of U.S. patent application Ser. No. 14/589,768, titled "DIGITAL SMART LABEL FOR SHIPPER WITH DATA LOGGER," filed on Jan. 5, 2015, which claims priority to and the benefit of U.S. Provisional Application No. 61/924,399, filed on Jan. 7, 2014, the entirety of these applications is hereby incorporated by reference herein.

BACKGROUND

1. Field

This specification relates to a system, device, apparatus or method for transporting a shipping container using an electronic shipping label.

2. Description of the Related Art

The present invention is especially well suited and adapted for use with packaging systems for cryogenic shipment of various materials including live cell bio-materials, vaccines, tissues, etc., and controlling shipments of materials using such a packaging system. Shipping of temperature controlled materials today usually requires a number of steps that require logistics support which increases cost and the chance for error that can damage the temperature controlled materials during shipping. Due to problems associated with dewars, it is common practice today to use dry ice for shipping many temperature controlled materials. Because dry ice has a limited holding time of 1-2 days, shipments of longer length or duration require the package to be "re-iced" which creates infrastructure issues usually involving subcontractors and multiple interventions with the packaging. Using dry ice also requires a shipper to source boxes for holding the dry ice and temperature controlled materials as well as sourcing the dry ice. Once this sourcing is complete, the sample must be packaged. Next, pick/up and movement of the sample must be orchestrated and re-icing logistics on international shipments must be managed. As part of the shipping process, somebody must manage the shipment, asking such questions as where is it, did it arrive and was its temperature okay when it arrived. The many drawbacks of this approach include that a customer must coordinate tasks in multiple locations, multiple steps and interventions increase chance of error and international sourcing and material handling can be complex. All of which can create unreliability.

The first step in the shipping process is for a customer to initiate one or more shipments from one or more customer origin points to one or more customer destinations. In its simplest form, a customer can initiate a single order of one shipping package from a single customer origin point to a single customer destination. For example, the customer might be a clinical site that is shipping a patient sample to a lab for testing. Upon initiation of an order, the customer identifies itself and the customer origin point (e.g., a location where the patient sample was obtained and stored awaiting shipment) as well as the location of the lab where the patient sample is to be sent.

When a customer initiates an order, certain information is obtained from the customer. This information can include what is to be shipped, the amount of material that is to be shipped, where it will be shipped (as there may be more than one location where material needs to be shipped), the date and time the material will be ready for shipment, an acceptable temperature range at which the material is to be maintained at all times during shipment, and other information that may be needed to comply with customs or other regulations. During the order process software will check to insure that any required shipping containers needed to fulfill the order will be available for the requested shipment date and time and begin the process of managing all shipments needed to fulfill the customer order and return any shipping containers to a repurposing site so that they can be reused.

Once a customer order is confirmed and the availability of a shipping container to fill the customer order is confirmed, the steps necessary to fulfill the order are initiated. These steps can be broken down broadly into preparing an itinerary of all required shipment legs and placing shipping orders for each shipment leg, preparing any shipping container needed to fill the customer order and shipping it to the customer origin point and tracking the entire shipping process.

Creating an itinerary of necessary shipments allows progress of the shipping container to be tracked and monitored against projected shipping times to ensure that the shipping container reaches the customer destination while the sample chamber in the shipping container is still being maintained at a temperature below a desired maximum temperature or within an acceptable temperature range. This is especially important because a shipping container charged with a cryogen has a limited lifespan before the cryogen ceases to maintain its sample chamber at a temperature below its desired maximum temperature. Since the itinerary is created before the shipping container reaches the customer origin point, the time needed for each shipping leg can be shortened and the limited lifespan of the cryogen can be maximized by maximizing the efficiency of the various shipments.

For example, once a customer order is placed and the customer origin point, the date and the time the customer's material will be ready for shipment are known, charging of the shipping container with its cryogen (liquid nitrogen or evaporated nitrogen) can be timed so that such charging takes place as close as possible to the time when the shipping container will be picked up for shipping by the shipper and as close as possible to the date and time the customer's material will be ready for shipment. When the shipping container arrives at the customer origin point, the customer should already be aware of the anticipated arrival time of the shipping container and be prepared to load the customer's temperature controlled material into the sample chamber of the shipping container and then return the loaded shipping container to a shipper for its next shipping leg. Again, since the time for such activity has already been calculated and anticipated, the order for picking up the shipper has already been placed (and verified), and once the loaded shipping container is picked up at the customer origin point, all that remains is for the shipment to be made to the customer destination according to the order for this shipping leg that was calculated as part of the initial itinerary. Alternatively, the order for picking up the shipper can be placed once delivery to the customer origin point is confirmed.

When the various shipping legs go according to schedule, there should be no problem in delivering the customer's temperature controlled material to the customer destination in accordance with the initial itinerary developed when the customer order is accepted. Also, because of the advance planning that goes into the itinerary, downtimes between shipping events are minimized, which means that there is greater room for error if something does not go according to schedule. Thus, rather than waiting a day or more between delivery of the shipping container to the customer origin point and its pickup, both events can conceivably be done the same day with an appropriate amount of time between them for loading the sample chamber.

In order for the various shipping legs to be done most efficiently, the initial shipping leg to the customer origin point is carefully controlled. Ideally, as already noted, this initial shipping leg is timed so that a shipping container is delivered to the customer origin point with a minimum amount of delay between the time that the shipping container is charged with a cryogen and the time that the shipping container arrives at the customer origin point. In addition, steps can be taken to simplify, speed up and ensure the accuracy of the later shipping legs by pre-printing labels for use on each shipping leg so that no additional shipping labels need to be filled out and so that no errors can be introduced into the shipping process due to incorrect entry of shipping information on a shipping label.

In one shipping packing system shown in U.S. Publication 2010-0299278-A1, published Nov. 25, 2010, the disclosure of which is specifically incorporated herein in its entirety, an additional shipping carton is included within the initial shipping container that contains preprinted shipping labels for each additional shipping leg, and flaps of the carton can be folded so that only one shipping label (for the next shipping leg) is visible at a time. Thus, when the shipping container leaves its original processing site, a dewar is packaged inside of a shipping box and supported within that box by foam packing materials. One flap of this box contains a shipping label for the shipment leg from the customer origin point to a customer destination and another flap of this box contains a shipping label for the return shipment leg from the customer destination to a reprocessing facility. This shipping box, in turn, is then included within a second outer shipping box which is used to ship the shipping container from its original processing site to the customer origin point. When the shipping container arrives at the customer origin point it is opened and the outer box is removed, the sample is inserted into the sample chamber and then the inner box is resealed with the customer destination label showing and it is ready for shipment. When the shipping container arrives at the customer destination point it is opened, the sample is removed, and then it is resealed with the reprocessing facility shipping label showing.

Tracking of the shipping container allows problems in the shipping process to be identified when they arise, and if necessary, steps can be taken to solve such problems. In this sense, tracking of the location of the shipping container can be used to measure the "health" of the shipping container and its sample chamber according to at least one preselected criterion.

For example, let us assume that an itinerary for a customer order provides that a shipping container is to be delivered to a customer origin point by 10 a.m. on a given day and it is then to be picked up at the same location at 3 p.m. the same day, but, for some reason, the shipping container is not picked up the same day. When the time for pickup has passed, and there is no confirmation of the pickup, and the shipping container is tracked as still being located at the customer origin point, a new order can be placed for pickup of the shipping container at the customer origin point at a later date and time. Any subsequent shipping legs in the order itinerary can be automatically adjusted at the same time by a software itinerary program having access to available shipping information. The new order can be placed automatically or after the reason for deviation from the itinerary has been investigated and it has been determined that the delay will not adversely affect shipment within a new itinerary timeframe for the customer order. Let us now assume that this new order, like the initial order, ends up the same way—with the shipping container again not being picked up at the scheduled pickup time. Let us also assume that repeated delays result in a conclusion that shipment cannot be made within a new itinerary timeframe for the customer order without adversely affecting the sample because the cryogen in the shipping container does not have sufficient useful life left to ensure the temperature of the sample chamber remains below its desired maximum temperature. At this point there are three options for dealing with the problem caused by the delay. The three options for dealing with the problem caused by the delay include (i) cancelling the order in its entirety, which may be better than losing the temperature controlled shipment during shipment due to excessive heat in the sample chamber, (ii) adding new cryogen to the shipping container, and/or (iii) supplying a replacement shipping container to the customer origin point for use in filling the customer order under a revised itinerary tied to the useful life of the replacement shipping container. Whichever alternative is chosen, the delay will not result in damage to the temperature controlled material during shipping because such material did not leave the customer origin point in a shipping container that would not be able to maintain the temperature of such material below a desired maximum temperature during shipment to the customer destination.

Rather than a delay in pickup at the customer origin point, other delays may occur during shipment after pickup at the customer origin point. For example, the shipping container may be shipped to an improper destination by the shipper or diverted to another location by a regulatory authority, or delay may be caused by unforeseen circumstances, customs authorities or some other regulatory authority. As long as the delay can be detected through knowledge of the location of the shipping container at a given point in time, appropriate steps can be taken, if need be, to deal with such delay. For example, if the shipping container has been misdirected or diverted, an order can be placed for a new shipping leg from the point where the shipping container is now located to the correct destination. Or, as was noted in the earlier scenario where delay occurred at the customer origin point, arrangements could be taken to have new cryogen added to the shipping container or a new shipping container could be delivered where the shipping container is located due to delay (for example, waiting to clear customs) so that the temperature controlled material can be transferred to the replacement shipping container with a longer useful life that will allow the temperature controlled material to reach the customer destination without damage caused by excessive temperature.

A critical element of the shipping process is the ability to track the location of the shipping container. Such location tracking allows verification of pick-up and delivery and identifies where a shipping container is delayed or to where it might be misdirected or diverted. Such tracking is accomplished by use of a wireless location sensor identified with the shipping container during its shipment. The sensor is uniquely identified with the shipping container and the customer order and can be readily tracked by computer tracking software as its location is detected. Although the location of the sensor might be monitored on a continuous basis during some or all of the shipping process, it need not necessarily be monitored on a continuous basis, so long as it is monitored during key points of the shipping process.

After the shipping container has been delivered to the customer destination, it will be returned to a reprocessing center where it can be conditioned for reuse. And, it is desirable that the return leg be included in the itinerary associated with a given customer order, that this return leg with a shipper be booked in connection with the initial customer order (and, if need be, modified when the itinerary is modified) and that a preprinted label for return to the reprocessing center be included with the shipping container. Reprocessing of the shipping container helps minimize landfill waste and reduce the cost of the overall shipping process. In addition, it can facilitate verification and accountability when a data log stored within the shipping container is downloaded as part of reprocessing.

Since tracking of the location of the shipping container allows the shipping progress to be documented and monitored real time by a computer, it also provides a mechanism for establishing why any delays are incurred in the shipping process, and if necessary, allocating any liability associated with such delays.

The methods described so far might be viewed as an initial or Phase I stage approach in which a web portal with software integrated to a shipper's information technology (such as FedEx®) is used to track shipping containers during transit and a combination of shipping container technology and shipping methodology work together to provide a solution that helps shippers of temperature controlled material simplify end-to-end shipping, improve reliability of frozen shipments and implement a "Green" alternative to present shipping methods, all at a reduced total cost.

Central to the foregoing scheme is the ability to accurately identify where a shipper is going, on multiple legs of its overall shipping journey, with the ability, if needed, to make changes to the shipping itinerary along the way when they are needed to change an order during transit. Since a company providing the overall logistics for the shipping plan must provide all of the shipping documentation up front for future legs of transportation, any change to the order requires the client or the client's consignee to remove the current documentation, print new documentation from the portal or from an email sent by customer service, and apply it to the package. In addition, packages need to be supplied with two boxes so that there is a place to apply the shipping labels for three or more different legs of transportation.

Accordingly, there is a need reduce the paper waste associated with the current methods of transporting a shipping container and a need for the ability to track and monitor the shipping container throughout the delivery process in real-time.

SUMMARY

In general, one aspect of the subject matter described in this specification is embodied in an electronic shipping label. The electronic shipping label includes a communication device. The communication device is configured to obtain from an electronic device multiple electronic image files that are stored on the electronic device. The multiple electronic image files represent shipping information associated with multiple legs that form a shipping itinerary. The electronic shipping label includes a touch-screen display. The touch-screen display has one or more user interface elements that are configured to toggle among the multiple electronic image files and initiate access to the shipping container. The electronic shipping label includes a processor. The processor is coupled to the communication device and the touch-screen display. The processor is configured to obtain, from the electronic device and using the communication device, a first electronic image file from the multiple electronic image files stored on the electronic device. The processor is configured to render, on the touch-screen display, the first electronic image file during a first leg of the plurality of legs of the shipping itinerary. The processor is configured to access a second electronic image file from the multiple electronic image files or the shipping container when the one or more user interface elements are selected.

These and other embodiments may optionally include one or more of the following features. The processor may be configured to obtain temperature monitoring data including a temperature within the shipping container. The processor may be configured to display, on the touch-screen display, the temperature within the shipping container. The electronic shipping label may include a memory. The memory may be configured to store a sequence of selections of the one or more user interface elements that access the shipping container when the one or more user interface elements are selected in the sequence.

The one or more user interface elements may include multiple buttons. Each button may have a different identifier. The processor may be configured to access the shipping container when the one or more buttons are pushed in sequence. The communication device may be configured to receive a current location of the shipping container. The processor may be configured to access the second electronic image file when the current location of the container is greater than a threshold distance from a first destination location associated with the first leg of the shipping itinerary. The touch-screen display may be configured to be powered by a power source and to visually display the first electronic image file even if the power source has failed. The electronic shipping label may include a non-reflective flexible plastic cover to be read by a laser of the electronic device.

In another aspect, the subject matter is embodied in a system for managing shipping of a shipping container. The system includes a web portal that monitors a shipping itinerary that has multiple legs. The system includes an electronic device in communication with the web portal. The electronic device stores multiple electronic image files associated with the multiple legs of the shipping itinerary. The system includes an electronic shipping label. The electronic shipping label includes a communication device. The communication device is configured to obtain from the electronic device the multiple electronic image files. The multiple electronic image files represent shipping information. The system includes a touch-screen display. The touch-screen display has one or more buttons. The one or more buttons are configured to toggle among the multiple electronic image files and provide access to the shipping container. The electronic shipping label includes a processor. The processor is coupled to the communication device and the touch-screen display. The processor is configured to obtain, from the electronic device and using the communication device, a first electronic image file. The processor is configured to render, on the touch-screen display, the first electronic image file during the first leg of the shipping itinerary. The processor is configured to access a second electronic image file or the shipping container when the one or more buttons are pushed.

In another aspect, the subject matter is embodied in a system for managing shipping of a shipping container. The system includes a web portal that monitors a shipping itinerary. The shipping itinerary has multiple legs that form the shipping itinerary. The system includes an electronic device. The electronic device is in communication with the web portal. The electronic device stores multiple electronic image files that are associated with the multiple legs of the shipping itinerary. The system includes an electronic shipping label. The electronic shipping label has a communication device for obtaining from the electronic device the multiple electronic image files stored on the electronic device. The electronic shipping label includes a processor connected to the communication device. The processor is configured to obtain, from the electronic device and using the communication device, a first electronic image file from the multiple electronic image files stored on the electronic device. The processor is configured to render the first electronic image file during the first leg of the shipping itinerary. The electronic shipping label has a display that visually displays the rendered first electronic image file that is to be read by a laser of the electronic device even if a power source that powers the display has failed.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices and/or methods for transporting a shipping container using an electronic shipping label. The electronic shipping label provides real-time display for any type of shipping label configuration regardless of carrier (i.e., bar-coding, formatting, and carrier specific information required etc.). This shipping label will be applied to one or more locations on the shipper. When modifications are required that will result in needing to change the shipping label, a web portal will send the new information to the electronic shipping label to change the display via an electronic device carried with the shipper, such as a smart data logger or a separate electronic device. Origin, destination, payload, and carrier can all be changed via some type of communication to the label (such as Wi-Fi, cellular or some other type of contactless communication) from the smart data logger or separate electronic device. This reduces paper usage. Currently, on average, 15 pages of 8.5"×11" paper are used for every international shipment and 6 pages for domestic shipments.

Other benefits and advantages including having the ability to automatically change shipping labels when the shipping container has moved onto another shipping leg of the shipping itinerary automatically without communication from the web portal. For example, once one shipping leg of the shipping itinerary has been completed, the electronic shipping label may automatically switch images to show the next shipping label associated with the next shipping leg. Thus, no coordination is needed between the origin or destination sites to change out paperwork when changes occur to the shipping itinerary or for the next leg of shipment. Currently the client has to pull paperwork from the completed shipping leg, then close a box with a different flap presented with the new leg of the shipping itinerary. This can often get mixed up resulting in the client shipping the commodity to the wrong address.

Additionally, the electronic shipping label may display other electronic images including commercial invoices, hazardous declaration sheets, certificates of origin and other related shipping documents. The status of the electronic device can also be displayed, which provides sensor information like current internal temperature. The electronic shipping label may also display history and statistics of sensor data collected. Instructions on how to load and unload the package can also be displayed. Access to other images can be obtained by toggling through various screen images by pushing a printed button on the electronic shipping label.

Moreover, the electronic shipping label may have numerous fail safes, such as the use of electronic ink (e-ink), which allows the electronic image on the electronic shipping label to remain persistent even without power.

Figure 1A:
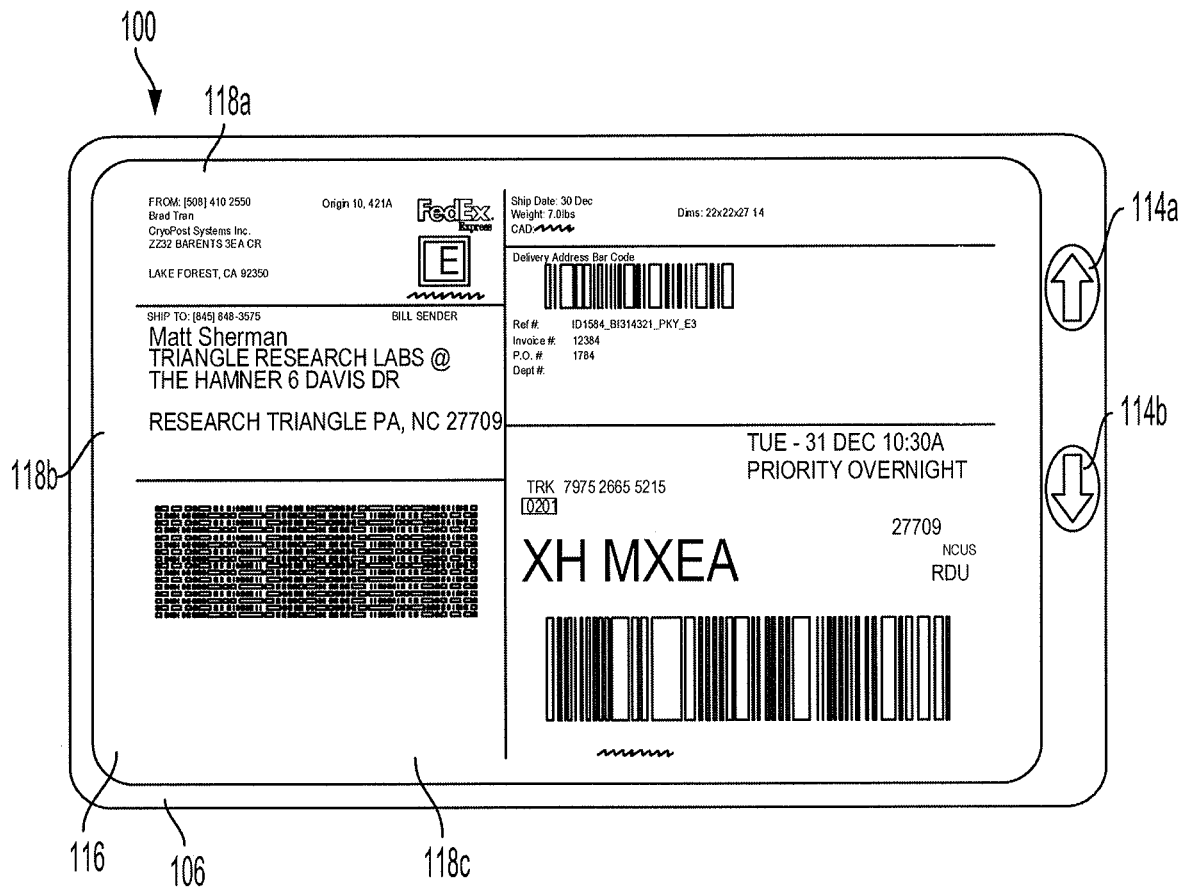
FIG. 1A shows an example electronic shipping label according to an aspect of the invention.
Figure 1B:
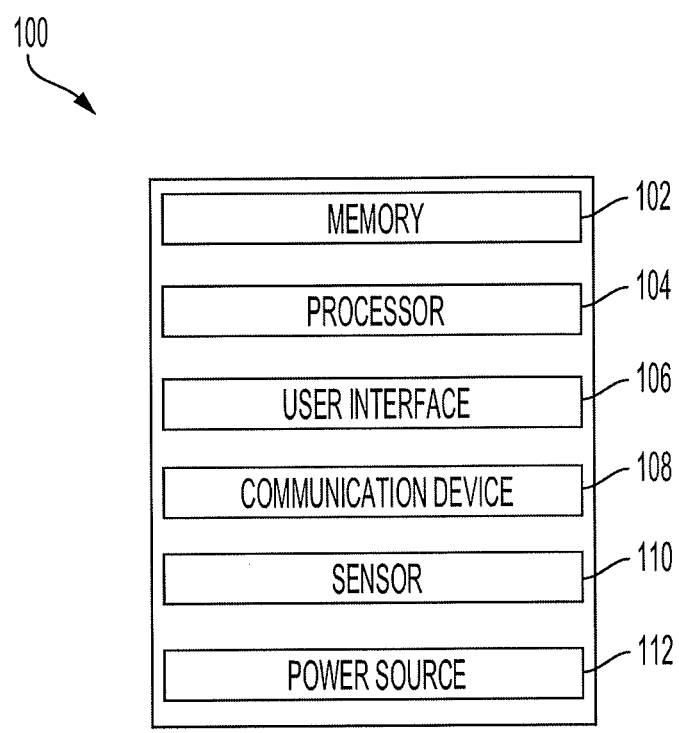
FIG. 1B shows a block diagram of the electronic shipping label of FIG. 1A according to an aspect of the invention.

FIG. 1A shows the electronic shipping label 100, and FIG. 1B shows a block diagram of the electronic shipping label 100. The electronic shipping label 100 may be a thin film shipping label and may display any type of shipping label configuration regardless of carrier (i.e. bar-coding, formatting, and carrier specific information required etc.).

The electronic shipping label 100 may be a thin film shipping label with dimensions of approximately 8.5" wide by 5.5" tall. The electronic shipping label 100 may be read by humans or by barcode scanner. The electronic shipping label 100 may be mounted on the outside of the shipping box where normal printed shipping labels are placed on the box. The electronic shipping label 100 may be made from a thin flexible plastic sheet and may have a protective clear flexible plastic cover that is not reflective and allows laser scanners to read the electronic shipping label 100.

The electronic shipping label 100 includes a memory 102, one or more processors 104, a user interface 106 and/or a communication device 108. The electronic shipping label 100 may have one or more sensors 110 and/or a power source 112. The memory 102 may store one or more electronic image files that are obtained from an electronic device 202 via the network 206. The memory 102 may be coupled to the one or more processors 104 and store instructions that the one or more processors 104 executes. The memory 102 may include one or more of a Random Access Memory (RAM) or other volatile or non-volatile memory.

The memory 102 may be a non-transitory memory or a data storage device, such as a hard disk drive, a solid-state disk drive, a hybrid disk drive, or other appropriate data storage, and may further store machine-readable instructions, which may be loaded and executed by the one or more processors 104. Moreover, the memory 102 may be used to store electronic image files that are associated with the transportation and/or shipment of the shipping container that the electronic shipping label 100 may be affixed to.

The one or more processors 104 may be implemented as a single processor or as multiple processors. The one or more processors 104 may be electrically coupled to the memory 102, the user interface 106, the communication device 108, the one or more sensors 110 and/or the power source 112. The one or more processors 104 may be a controller or a microcontroller specifically designed for retrieving electronic image files and displaying the electronic image files during the transportation or shipment of a shipping container. The one or more electronic image files may include an air-bill, shipping address, sender address, sensor data from the electronic device 202 including temperature data, a bar-code and/or other shipping information for each leg of a shipping itinerary.

Figure 2:
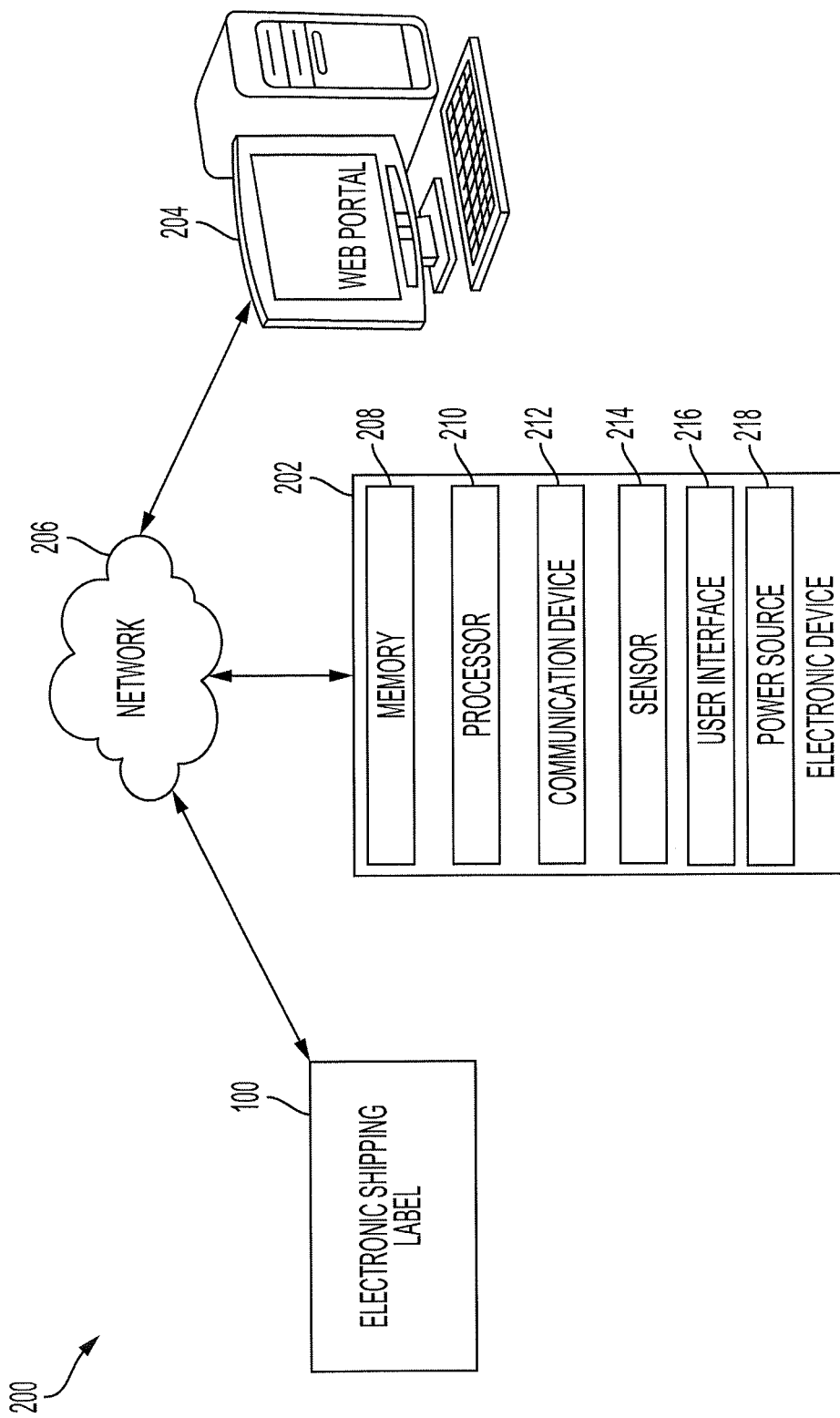
FIG. 2 shows a block diagram of an example shipping and logistics system according to an aspect of the invention.

The electronic shipping label 100 may have a communication device 108. The communication device 108 may be a network access device. The communication device 108 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The communication device 108 may transmit data to and receive data from the electronic device 202 and/or the lock mechanism 220. For example, the one or more processors 104 may communicate with the electronic device 202 to obtain the multiple electronic image files and/or sensor data via the network 206. FIG. 2 further describes the different components from which the electronic shipping label may communicate with using the communication device 108 to obtain multiple electronic image files and/or sensor data.

The electronic shipping label 100 includes a user interface 106. The electronic shipping label 100 may display shipping information, sensor data, notifications and/or other information on the user interface 106. The user interface 106 may include an input/output device that receives user input from a user interface element, a button, a dial, a microphone, a keyboard, or a touch screen. The user interface 106 may have an output device, such as a display 116, a speaker, an audio and/or visual indicator, a touch-screen display or a refreshable braille display.

The user interface 106 may have a display 116. The display 116 may be used to display one of the one or more electronic image files obtained from the electronic device 202. The electronic image file may show, for example, a shipping address, a return address, a bar code, a commercial invoice, a hazardous declaration sheet, a certificate of origin and/or other shipment information including loading and unloading instructions. The display 116 may be apportioned into one or more sections 118a-c. The one or more sections 118a-c allow for the electronic shipping label 100 to display multiple electronic image files, simultaneously. For example, in one section, such as the section 118a, the electronic shipping label 100 may display the return address, and in another section, the electronic shipping label 100 may display unloading/loading instructions.

Figure 3:
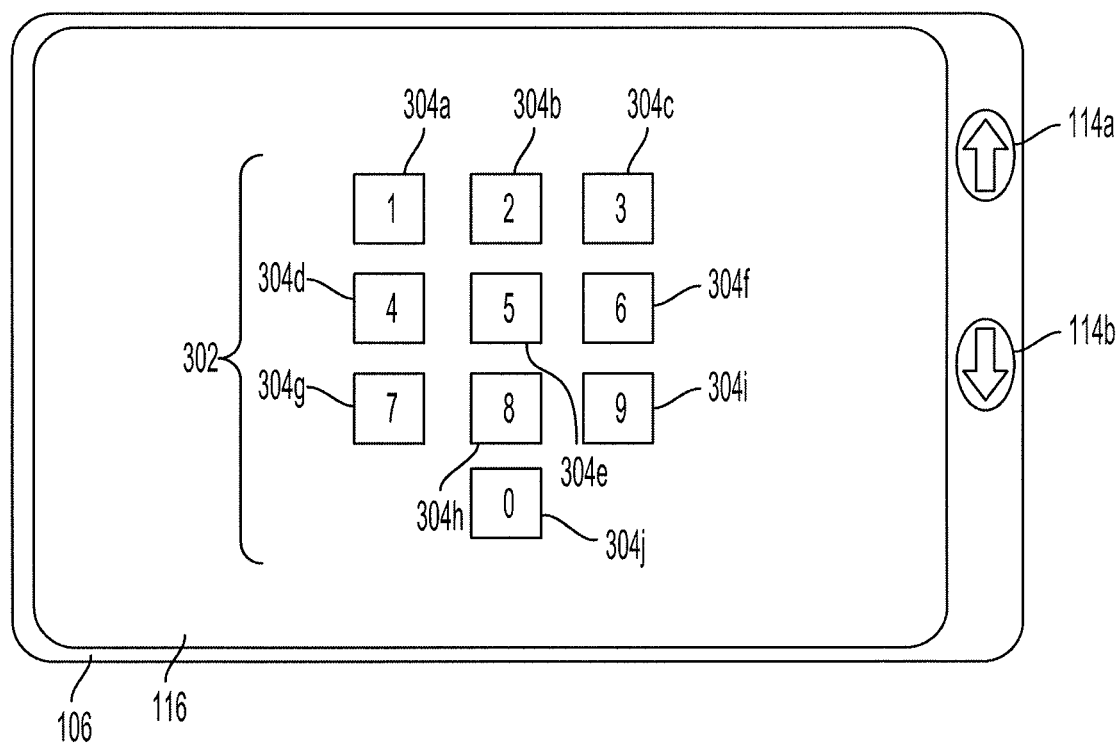
FIG. 3 shows a keypad on the display of the electronic shipping label of the shipping and logistics system of FIG. 1, which controls a lock mechanism on the shipping container, according to an aspect of the invention.

The user interface 106 may include one or more buttons 114a-b. When the user interface 106 receives a selection of one of the one or more buttons 114a-b, the electronic shipping label 100 may switch, toggle, change or otherwise display a different electronic image file on the display 116. The one or more buttons 114a-b may be a physical user interface element in proximity to the display 116 and/or a user interface element on the display 116, such as on a touch-screen display. The electronic shipping label 100 may display multiple user interface elements that when keyed or selected in a sequence may lock or unlock the shipping container, as shown in FIG. 3 for example. The display 116 may display a keypad 302. The keypad 302 may include multiple user interface elements 304a-j. Each user interface element 304a-j may represent a number on the keypad 302. The user interface 106 may receive one or more selections of the one or more user interface elements 304a-j in an entered sequence when a user depresses the one or more user interface elements 304a-j. The electronic shipping label 100 may compare the entered sequence of the one or more selections of the one or more user interface elements 304a-j with a stored passcode sequence of the one or more user interface elements 304a-j that was previously configured and stored in the memory 102. If the entered sequence matches the passcode sequence, the electronic shipping label may send a signal to a lock mechanism 220 on the shipping container that unlocks the shipping container when the shipping container is in a locked state and/or locks the shipping container when the shipping container is in an unlocked state. That is, the signal switches the state of the lock mechanism 220 from locked to unlocked and/or from unlocked to locked. In some implementations, different sequences of the one or more user interface elements 304a-j may be used to lock or unlock the shipping container. The keypad may be an alphanumeric keypad that includes numbers, letters and/or a combination of both.

The electronic shipping label 100 may have one or more sensors 110 and/or a power source 112. The one or more sensors 110 may be a temperature sensor that measures temperature within the shipping container, a light sensor that measures ambient light and/or other environmental sensor that measures the environmental condition within the shipping container.

The electronic shipping label 100 may be a thin film shipping label and may be powered by a power source 112. The power source 112 may be included within the electronic shipping label 100 or may be on the electronic device 202. The power source 112 may be a printed battery, for example, or other non-lithium based power source that allows for safe use during air transport. The electronic shipping label may have a fail safe mode in the event that the power source 112 on the electronic device 202 fails. When the power source 112 on the electronic shipping label 100 fails and/or the power source 218 on the electronic device 202 fails, the display 116 may remain active and continue to display the last electronic image file that was displayed on the display 116 prior to loss of power using printed battery power, for example.

FIG. 2 shows a block diagram of a shipping and logistics system 200. The shipping and logistics system 200 includes the electronic shipping label 100, the electronic device 202, which may be a smart data logger, and a web portal 204. The shipping and logistics system 200 may also include a lock mechanism 220. The lock mechanism 220 may be a shipper lock mechanism that is positioned on the shipping container and locks, unlocks or otherwise controls access to the payload or content storage area within the shipping container. The electronic shipping label 100, the electronic device 202, the lock mechanism 220 and/or the web portal 204 may be connected via the network 206. The network 206 may be a local area network (LAN), a wide area network (WAN), a cellular network, the Internet, or combination thereof, that connects, couples and/or otherwise communicates between the different components of the shipping and logistics system 200 including the electronic shipping label 100, the electronic device 202, the lock mechanism 220 and/or the web portal 204.

The electronic shipping label 100 is shown above in FIG. 1A, for example. The electronic device 202 may be a smart data logger. The electronic device 202 may be contained within the shipping container and stay within proximity to the electronic shipping label 100 such that the electronic device 202 stays in communication with the electronic shipping label 100 during transport. Moreover, the electronic device 202 communicates with the web portal 204, which monitors each leg of the shipping itinerary. Each leg of the shipping itinerary may have an origin and a destination. The destination of one leg of the shipping itinerary may be the origin of the next leg of the shipping itinerary. The electronic device 202 may periodically or in real-time update the web portal 204 and/or the electronic shipping label 100 with sensor data, monitoring data and/or shipping information.

The electronic device 202 may include a memory 208, one or more processors 210, a communication device 212 and/or a sensor 214. The electronic device may include a user interface 216 and/or a power source 218. The memory 208 may store the shipping itinerary obtained from the web portal 204 and the one or more electronic image files associated with each leg of the shipping itinerary. Moreover, the memory 208 may store instructions executed by the one or more processors 210. The memory 208 may include one or more of a Random Access Memory (RAM) or other volatile or non-volatile memory. The memory 208 may be a non-transitory memory or a data storage device, such as a hard disk drive, a solid-state disk drive, a hybrid disk drive, or other appropriate data storage, and may further store machine-readable instructions, which may be loaded and executed by the one or more processors 210.

The user interface 216 may include an input device that receives user input from a user interface element, a scanner, button, a dial, a microphone, or a keyboard but may not have an output device, such as a display, a speaker, an audio and/or visual indicator, a touch-screen display or a refreshable braille display. Instead, the electronic device 202 may use the electronic shipping label 100 as the output device. The power source 218 may be used to power the electronic device 202 and/or provide power to the electronic shipping label 100.

The one or more processors 210 may be coupled to the memory 208, the communication device 212, the user interface 216, the power source 218 and/or the sensor 214. The one or more processors 210 may perform functions, such as obtaining the shipping itinerary and the one or more electronic image files from the web portal 204 and providing the one or more electronic image files to the electronic shipping label 100 using the communication device 212, and/or obtaining sensor data to provide to the electronic shipping label 100 and/or the web portal 204. The electronic device 202 may use the one or more sensors 214, such as a temperature sensor to obtain temperature data of the shipping container, and/or a Global Positioning System device to determine a location of the electronic device 202 and/or shipping container. The memory 208, the one or more processors 210, the communication device 212, the user interface 216, the one or more sensors 214 and/or the power source 218 of the electronic device 202 may be similar in structure and/or function as the memory 102, the one or more processors 104, the communication device 108, the user interface 106, the one or more sensors 110 and/or the power source 112 of the electronic shipping label 100, respectively.

Figure 7:
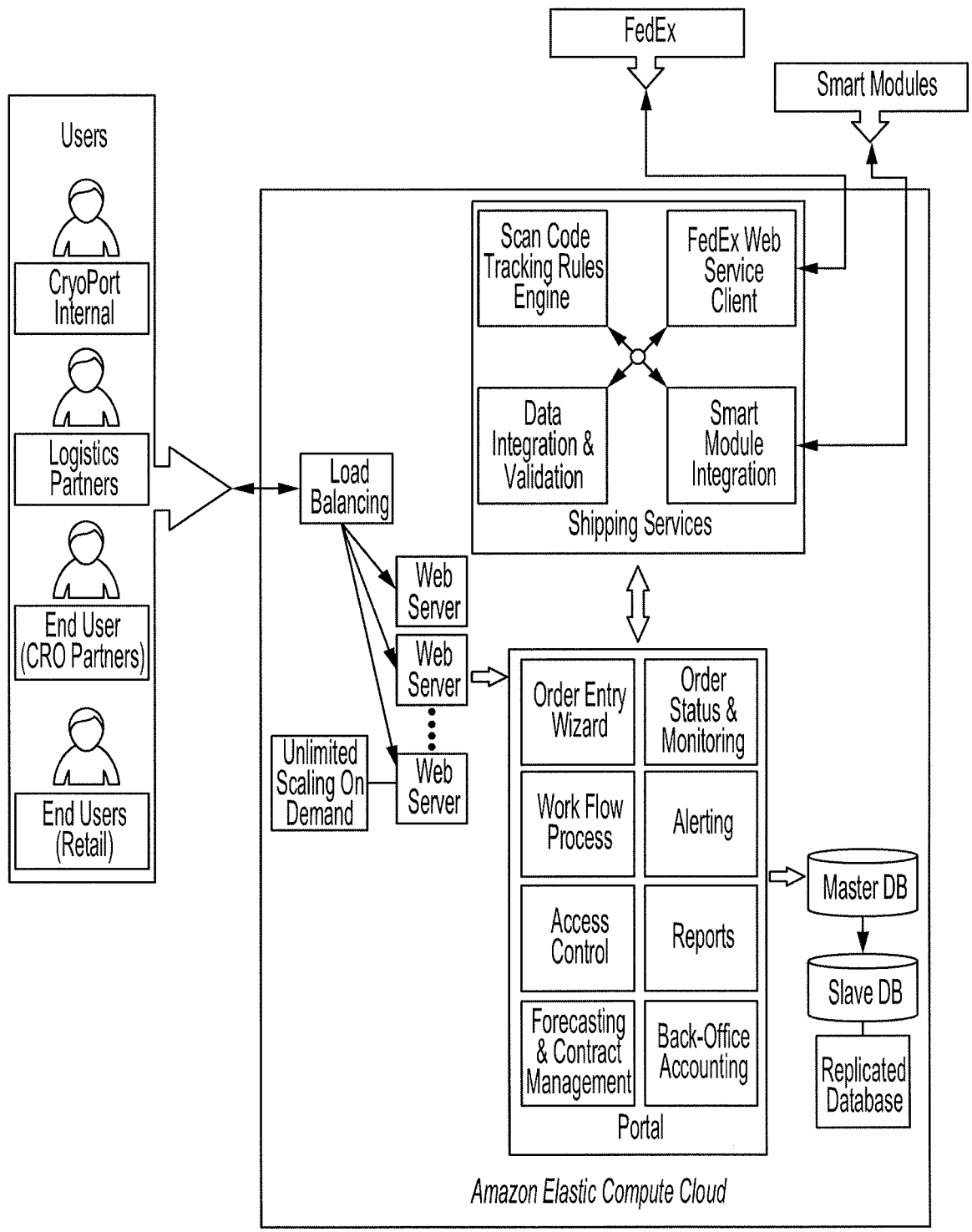
FIG. 7 shows an example overall web portal architecture for the web portal of the shipping and logistics system of FIG. 2 according to an aspect of the invention.

The web portal 204 may generate, receive or otherwise obtain the shipping itinerary. The web portal 204 may obtain shipping datasets for one or more legs of a shipping itinerary and form the shipping itinerary using the shipping datasets. Once the shipping itinerary is formed, the web portal 204 may generate electronic image files associated with each leg of the shipping itinerary and provide the electronic image files to the electronic device 202 for display on the electronic shipping label 100. Moreover, the web portal 204 may receive data, such as sensor data, from the electronic device 202 and display the data to the user to allow the user to monitor the shipping container during transit on each leg of the shipping itinerary. FIG. 7 shows a web portal architecture for the web portal 204, which creates the shipping itinerary and/or displays monitoring information of the shipping container during transit.

Figure 4:
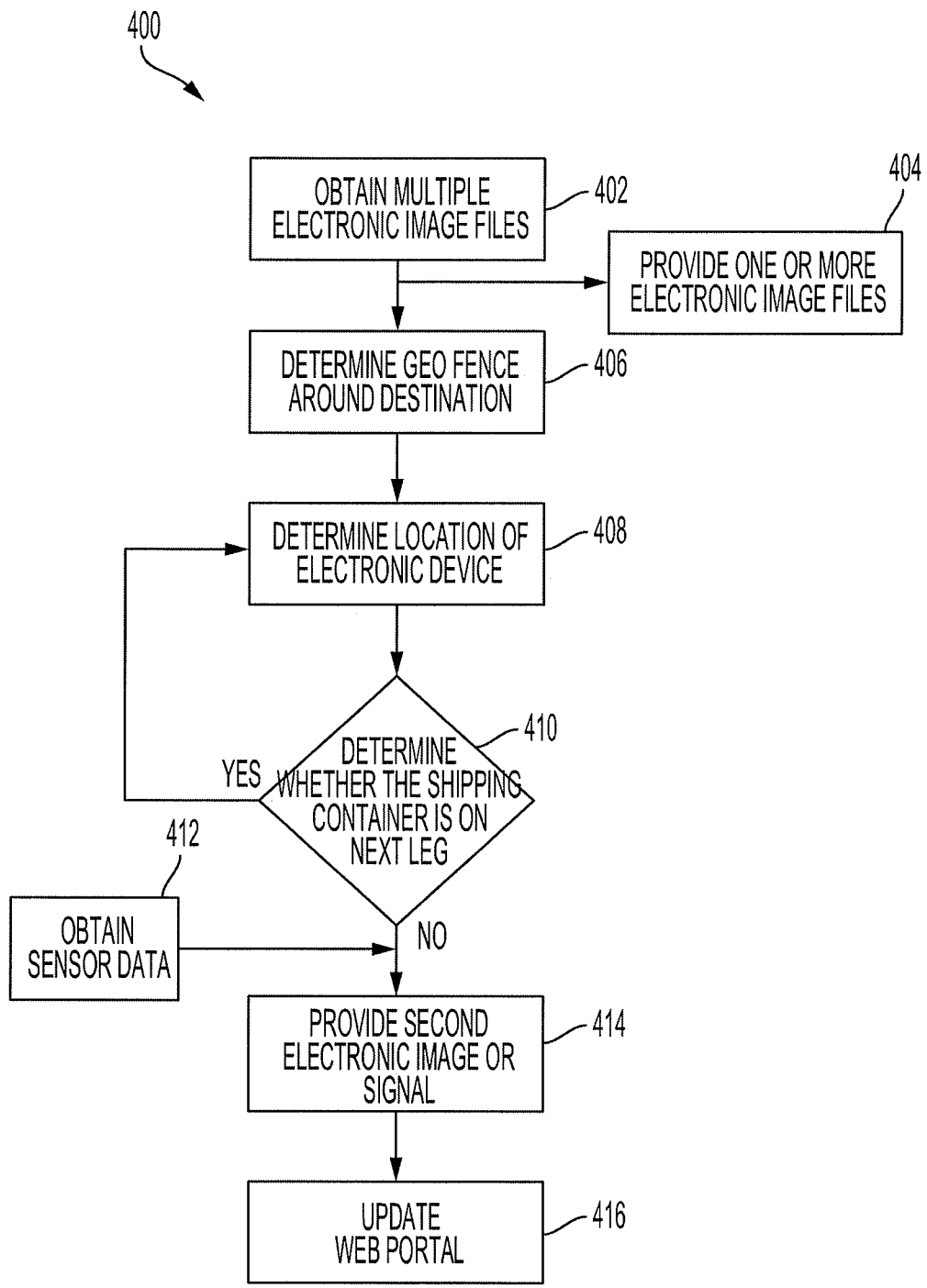
FIG. 4 is a flow diagram of an example process for obtaining and providing electronic images to the electronic shipping label using the electronic device of the shipping and logistics system of FIG. 2 according to an aspect of the invention.

FIG. 4 is a flow diagram of an example process 400 for obtaining and providing electronic images to the electronic shipping label 100. One or more computers or one or more data processing apparatuses, for example, the one or more processors 210 of the electronic device of the shipping and logistics system 200 of FIG. 2, appropriately programmed, may implement the process 400.

The electronic device 202 receives, obtains, or generates multiple electronic image files, which may be stored within the electronic device 202 (402). The electronic device 202 may obtain a shipping request that includes the shipping itinerary from the web portal 204 via the network 206. A shipper may generate the shipping itinerary using web portal 204. The web portal 204 may receive a shipping request that includes the shipping itinerary and/or other additional information and provide the shipping request to the electronic device 202. The shipping itinerary may be formed from an initial shipping dataset. A shipping dataset may include the sender's information, such as address, name, handling instructions or other contact information, and the receiver's information, such as address, name, or other instructions. The shipping dataset may include other additional information, such as routing information, barcode, air waybill, unloading or loading instructions, transport instructions including an indicator of the direction of orientation of the shipping container, and/or other handling instructions.

The shipping itinerary includes the one or more legs that form the shipping itinerary. Each leg of the shipping itinerary may be associated with a shipping dataset, which includes shipping information, such as a bar code, air waybill or other identifier that provides detailed information about the shipment and allows the shipment to be tracked including a destination address and/or a sender address. One or more electronic images may be associated with a single shipping dataset. For example, one electronic image may display a subset of the shipping dataset that indicates the bar code and/or air waybill, and another electronic image may display another subset of the shipping dataset that indicates the handling instructions.

The electronic device 202 provides one or more electronic image files to the electronic shipping label 100 (404). The electronic device 202 may provide all of the one or more electronic image files associated with all the legs of the shipping itinerary to the electronic shipping label 100 so that the electronic shipping label 100 may store the electronic image files in storage in the event the electronic device 202 is unable to communicate with the electronic shipping label 100. In some implementations, the electronic device 202 may provide only the electronic image file associated with a current leg of the shipping itinerary to minimize resource utilization on the electronic shipping label 100. The electronic image file displays an image of the information within the shipping dataset associated with the electronic image file.

The electronic device 202 may determine or calculate a geo-fence around a destination address associated with a current leg of the shipping itinerary (406). The geo-fence around the destination address may be an area that is within a threshold distance of the destination address, such as approximately ½-1 mile. The geo-fence may be used to trigger the electronic device 202 to update the electronic shipping label 100 with the next electronic image file that is associated with the next leg of the shipping itinerary.

The electronic device 202 may determine or detect a location of the electronic device 202 and/or shipping container (408). The electronic device 202 may use one or more sensors 214, such as a Global Positioning System (GPS) device, to determine the location of the electronic device 202. Since the electronic device 202 may be affixed to the shipping container in proximity to the electronic shipping label 100, the location may also identify the location of the shipping container during transport of a leg of the shipping itinerary.

The electronic device 202 may determine whether the shipping container is being transported on the next leg of the shipping itinerary (410). The electronic device may determine that the shipping container is being transported on the next left of the shipping itinerary when the electronic device 202 exits the geo-fence, such as when the electronic device 202 first enters the geo-fence, stops at the destination address and subsequently exits the geo-fence.

First, the electronic device 202 may determine that the electronic device 202 has entered within the geo-fence, e.g., when the location of the electronic device 202 is within the threshold distance of the destination address. Subsequently, the electronic device 202 may determine that the electronic device 202 has visited the destination address, e.g., when the location of the electronic device is at, near or in proximity to the destination address. Finally, the electronic device may determine that the electronic device 202 has exited the geo-fence when the location of the electronic device 202 exceeds the threshold distance from the destination address.

The electronic device 202 may obtain sensor data using the one or more sensors 214 (412). For example, the electronic device 202 may use a temperature sensor to measure the temperature within the shipping container or a humidity sensor to measure the humidity within the shipping container. The electronic device 202 may use other environmental sensors to measure other environmental factors. In another example, the one or more sensors 214 may include a camera, which may take images of the shipping container, to ensure that the shipping container has not been tampered or damaged.

The electronic device 202 provides another electronic image file or signals the electronic shipping label to change to the next electronic image file to update the display of the electronic shipping label (414). The electronic device 202 may provide the other electronic image file in response to the electronic device 202 determining that the shipping container has exited the geo-fence or when the electronic device 202 receives or obtains the other electronic image file from user input, such as a scan of a shipping dataset, or from the web portal 204 in response to the electronic device 202 signaling to the web portal 204 that the electronic device 202 has exited the geo-fence, for example.

The electronic image file may be associated with the next leg of the shipping itinerary, which may show a different shipping dataset than the electronic image file associated with the current leg of the shipping itinerary. In some implementations, the electronic device provides an electronic image file that is generated based on the sensor data. The electronic image file may show statistics, such as the temperature, humidity or other environmental factors of the current state of the shipping container or image of the shipping container. The electronic device 202 may send or otherwise transmit a signal to the electronic shipping label 100 to toggle to the next electronic image file, which may be associated with the next leg of the shipping container.

The electronic device 202 may also update the web portal 204 with the sensor data and/or status, e.g., location of the shipping container (416). The electronic device 202 may provide the sensor data including temperature, humidity or other environmental factors of the shipping container and/or the image of the shipping container to the web portal 204 so that a user may view and monitor status of the shipping container during transit.

Figure 5:
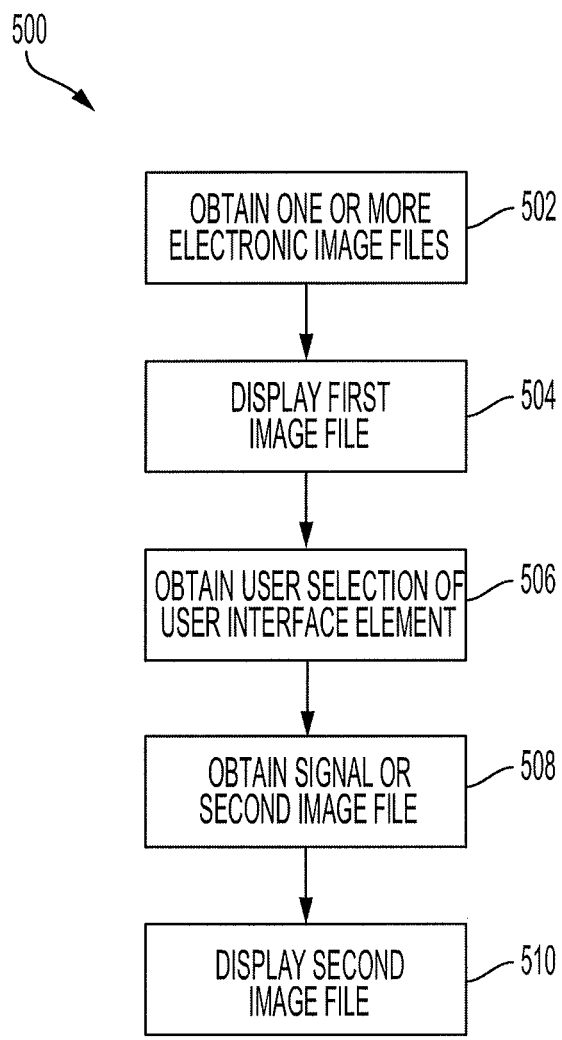
FIG. 5 is a flow diagram of an example process for displaying shipping information on the electronic shipping label of the shipping and logistics system of FIG. 2 according to an aspect of the invention.

FIG. 5 is a flow diagram of an example process 500 for displaying shipping information on the electronic shipping label 100. One or more computers or one or more data processing apparatuses, for example, the one or more processors 104 of the electronic shipping label 100 of the shipping and logistics system 200 of FIG. 2, appropriately programmed, may implement the process 500.

The electronic shipping label 100 obtains the one or more electronic image files (502). The electronic shipping label 100 may obtain the one or more electronic image files from the electronic device 202 or other mobile device. The electronic image file may include the shipping dataset associated with a leg of the shipping itinerary. The electronic shipping label may obtain the one or more electronic image files and store the one or more electronic image files in the memory 102. The one or more electronic image files may be ordered such that the first electronic image is associated with the first leg of the shipping itinerary and the subsequent legs are ordered in the order of the different legs of the shipping itinerary. The one or more electronic image files may not be ordered but rather have an identifier that indicates the corresponding leg of the shipping itinerary that the electronic image file is associated with. As the shipping container traverses through the shipping itinerary, the electronic shipping label 100 may receive a signal that includes the identifier, which triggers display of the electronic image file that corresponds with the identifier.

In some implementations, the one or more electronic image files may be associated with sensor data, such as orientation, ambient temperature, ambient pressure, ambient humidity, ambient lighting, shock or other related environmental factors within the shipping container, or other additional information, such as unloading/loading instructions, warning labels, or an invoice. These electronic image files may similarly be ordered in sequence among the one or more electronic image files.

The electronic shipping label 100 displays the electronic image file (504). One or more electronic image files may be associated with the each leg of the shipping itinerary. If there are multiple electronic image files associated with the leg of the shipping itinerary, the electronic shipping label 100 may display the multiple electronic image files in different sections of the display 116. In some implementations, the electronic image file may be associated with other information, such as the sensor data or other shipping information.

The electronic shipping label 100 may obtain a user selection of one or more user interface elements (506). The user selection of the one or more user interface elements may be a depression of a physical button on the electronic shipping label 100 and/or a user interface element displayed on a touch-screen display of the electronic shipping label 100. The depression of the physical button and/or the user interface element may signal the electronic shipping label 100 to toggle to the next electronic image file in an ordered sequence of the multiple electronic image files.

The electronic shipping label 100 obtains the signal or a second electronic image file (508). The electronic shipping label 100 may obtain the signal or the second electronic image file from the electronic device 202, be triggered by user input, such as the selection of a button, or be triggered by a timer, such as after a threshold amount of time has elapsed. The signal may indicate to the electronic shipping label 100 that the electronic device 202 has exited the geo-fence surrounding the destination location of a leg of the shipping itinerary, a threshold amount of time has elapsed or that a user has selected a button to toggle through the multiple electronic image files. When the electronic shipping label 100 receives the second electronic image file, this may indicate to the electronic shipping label 100 that the electronic device 202 has exited the geo-fence surrounding the destination location of a leg of the shipping itinerary.

The electronic shipping label 100 displays the second electronic image file (510). When the electronic shipping label 100 receives the signal or the second electronic image file from the electronic device 202, the electronic shipping label 100, in response, may update the first electronic image file with the second electronic image file. This allows for the display 116 of the electronic shipping label 100 to be updated with the new information in the second electronic image file, such as the shipping dataset for the next leg of the shipping itinerary, sensor data, and/or other shipping information, such as handling/loading instructions. In some implementations, the electronic shipping label 100 switches to the second electronic image file in response to receiving a selection of a button that toggles through the multiple electronic image files.

When the electronic shipping label 100 displays the second electronic image file and the second electronic image file is not displaying the shipping data for the leg of the shipping itinerary, the electronic shipping label 100 may switch back to an electronic image file that shows the shipping dataset for the leg of the shipping itinerary after a threshold amount of time, such as approximately 30 seconds. This ensures that an electronic image file that shows the shipping dataset for the current leg of the shipping itinerary is displayed during transit.

Figure 6:
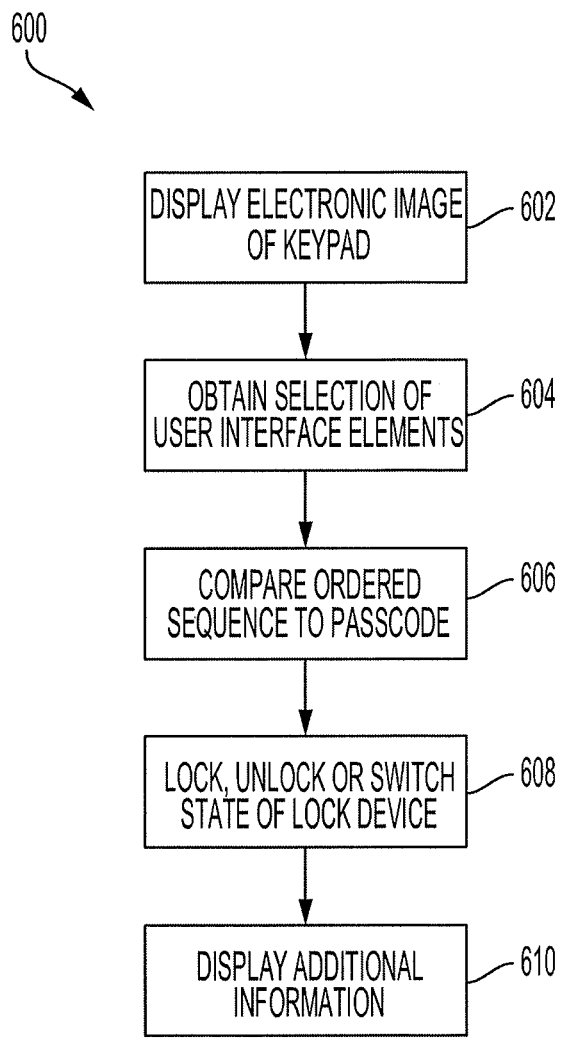
FIG. 6 is a flow diagram of an example process for accessing the shipping container through the electronic shipping label 100 of the shipping and logistics system of FIG. 2 according to an aspect of the invention.

FIG. 6 is a flow diagram of an example process 600 for accessing the shipping container through the electronic shipping label 100. One or more computers or one or more data processing apparatuses, for example, the one or more processors 104 of the electronic shipping label 100 of the shipping and logistics system 200 of FIG. 2, appropriately programmed, may implement the process 600.

The electronic shipping label 100 displays an electronic image file on the display 116 that includes a keypad 302 (602). The keypad 302 has multiple user interface elements 304*a-j*, and each user interface element 304*a-j* may be sensitive to touch and associated with an identifier, such as an alphanumeric value. The multiple user interface elements 304*a-j* may be arranged as a number pad, a conventional keyboard or in any other arrangement.

The electronic shipping label 100 obtains a selection of one or more of the multiple user interface elements 304*a-j* in an entered sequence (604). When a user touches, depresses or otherwise interacts with one of the multiple user interface elements 304*a* j, the electronic shipping label 100 stores the entered sequence of identifiers and the order in which the identifiers are entered.

The electronic shipping label 100 compares the entered sequence of the selection of the one or more of the multiple interface elements 304*a-j* to a passcode sequence (606). The passcode sequence is an ordered sequence of a pre-configured or pre-stored user configured sequence of identifiers that authenticates an entered sequence to switch the state of a lock mechanism to access or lock the shipping container.

The electronic shipping label 100 locks, unlocks or switches the state of the lock mechanism to allow or deny access to the shipping container based on the comparison (608). If the entered sequence of the selections matches the passcode sequence, the electronic shipping label 100 may unlock the lock mechanism 220, e.g., by sending a signal to the lock mechanism 220, to allow access to the shipping container. In some implementations, when the entered sequence of the selections matches the passcode sequence, the electronic shipping label 100 may switch the state of the lock mechanism 220, e.g., from lock to unlock or unlock to lock. If the entered sequence of the selections does not match the passcode sequence, the electronic shipping label may display a failure notification on the display 116 or otherwise notify the user.

The electronic shipping label 100 may display additional information when the state of the lock mechanism 220 changes (610). For example, when the lock mechanism 220 is switched from a locked state to an unlocked state, the electronic shipping label 100 may display additional information, such as loading/unloading information, in response to the switch in states. In another example, when the lock mechanism 220 is switched from an unlocked state to a locked state, the electronic shipping label 100 may display an electronic image file with the next set of shipping data including next destination location, sensor data or other shipping information, such as a "handle with care" notification.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for managing shipping of a shipping container, comprising:
   a web portal that monitors a shipping itinerary of the shipping container and a health of the shipping container according to at least one preselected criteria;
   an electronic device affixed to the shipping container and in communication with the web portal and that stores a first electronic image file associated with the shipping itinerary;
   a sensor inside the shipping container and providing the sensor data to the electronic device, wherein the electronic device transmits the sensor data to the web portal,
wherein the web portal receives the sensor data corresponding to a temperature within the shipping container,
wherein the at least one preselected criteria comprises a preselected threshold temperature or temperature range;
an electronic shipping label in proximity to the electronic device, the electronic shipping label having:
 a communication device for obtaining from the electronic device the first electronic image file stored on the electronic device;
 a processor connected to the communication device and configured to:
  obtain, from the electronic device and using the communication device, the first electronic image file stored on the electronic device, and
  render the first electronic image file during the shipping itinerary,
wherein the electronic device is configured to:
 determine a location of the electronic device,
 determine a geo-fence surrounding a destination location of the shipping itinerary,
 wherein the geo-fence surrounding the destination location comprises an area that is within a threshold distance of the destination location,
 determine that the electronic device has entered, stopped in, and exited the geo-fence surrounding the destination location of the shipping itinerary based on the destination location and the location of the electronic device; and
 provide a second electronic image file or a signal to the electronic shipping label to indicate to the electronic shipping label to change to the second electronic image file in response to the determining that the electronic device has exited the geo-fence surrounding the destination location; and
a display that visually displays the rendered electronic image file that is to be read by a laser device even if a power source that powers the display has failed.

2. The system of claim 1, wherein the electronic shipping label is configured to:
receive the second electronic image file or the signal when the electronic device exits the geo-fence; and
display the second electronic image.

3. The system of claim 1, wherein the display has a plurality of user interface elements, wherein the processor is configured to:
receive a plurality of selections of the plurality of user interface elements in an ordered sequence, wherein the ordered sequence matches a stored sequence of selections of the plurality of user interface elements;
switch a locking mechanism of the shipping container from a locked state to an unlocked state to access the shipping container in response to a match of the ordered sequence and the stored sequence; and
output, on the display, loading and unloading instructions of the shipping container in response to the switching the locking mechanism to the unlocked state.

4. The system of claim 1, wherein the web portal generates an alert upon detecting a trend predicting that the temperature will exceed the preselected threshold temperature or temperature range within a predetermined time.

5. The system of claim 1,
wherein the sensor further provides the sensor data to the electronic shipping label,
wherein the processor of the electronic shipping label is further configured to render a visual representation of the sensor data during the shipping itinerary, and
wherein the display visually displays the visual representation of the sensor data.

6. The system of claim 1, wherein the first electronic image file comprises a shipping address and wherein the electronic shipping label visually displays a second electronic image file including the sensor data, wherein the electronic shipping label displays the first and second electronic image file simultaneously.

7. The system of claim 1, wherein the electronic device transmits the sensor data to the web portal in real time.

8. The system of claim 1, wherein the electronic device transmits the sensor data to the web portal periodically.

9. The system of claim 1, wherein the processor is configured to output, on the display, loading and unloading instructions of the shipping container.

10. A system for managing shipping of a shipping container, comprising:
a web portal that monitors a shipping itinerary of the shipping container and a health of the shipping container according to at least one preselected criteria;
an electronic device affixed to the shipping container and in communication with the web portal and that stores a first electronic image file associated with the shipping itinerary;
a sensor inside the shipping container and providing the sensor data to the electronic device,
wherein the electronic device transmits the sensor data to the web portal,
wherein the web portal receives the sensor data corresponding to a temperature within the shipping container,
wherein the at least one preselected criteria comprises a preselected threshold temperature or temperature range;
an electronic shipping label in proximity to the electronic device, the electronic shipping label having:
 a communication device for obtaining from the electronic device the first electronic image file stored on the electronic device;
 a processor connected to the communication device and configured to:
  obtain, from the electronic device and using the communication device, the first electronic image file stored on the electronic device; and
  render the first electronic image file during the shipping itinerary,
wherein the electronic device is configured to:
 determine a location of the electronic device;
 determine a geo-fence surrounding a destination location of the shipping itinerary,
 wherein the geofence surrounding the destination location comprises an area that is within a threshold distance of the destination location;
 determine based on the destination location and the location of the electronic device that the electronic device (i) has entered the geo-fence surrounding the destination location at a first time by determining that the electronic device is within the threshold distance of the destination location, (ii) stopped at the destination location at a second time after the first time, and (iii) exited the geo-fence surrounding the destination location at a third time after the second time by determining that the electronic device is beyond the threshold distance of the destination location; and provide a second electronic image file or a signal to the electronic shipping label to indicate to the electronic shipping label to change to the second electronic image file in response to the determining that the electronic device has exited the geo-fence surrounding the destination location; and a display that visually displays the rendered electronic image file that is to be read by a laser device even if a power source that powers the display has failed.

* * * * *